United States Patent [19]
Prescott

[11] 3,979,866
[45] Sept. 14, 1976

[54] NUCLEAR REACTORS

[75] Inventor: Robert Frank Prescott, Oadby, England

[73] Assignee: Nuclear Power Co. (Whetstone) Limited, Leicester, England

[22] Filed: Oct. 21, 1974

[21] Appl. No.: 516,358

[30] Foreign Application Priority Data
Oct. 23, 1973 United Kingdom............... 49216/73
May 2, 1974 United Kingdom............... 19428/74

[52] U.S. Cl................................ 52/249; 52/410; 52/573; 110/1 A; 176/87
[51] Int. Cl.²................. E04G 11/04; G21C 13/04; E04B 2/06
[58] Field of Search............... 110/1 A; 220/15; 52/573, 249, 410, 562–564, 508–513, 498; 176/87

[56] References Cited
UNITED STATES PATENTS

| | | | |
|---|---|---|---|
| 732,725 | 7/1903 | Edgar | 110/1 A |
| 1,262,009 | 4/1918 | Brady | 220/15 |
| 2,460,052 | 1/1949 | Werner | 52/573 |
| 2,656,902 | 10/1953 | Gotshall | 52/573 |
| 2,769,333 | 11/1956 | Reintjes | 52/410 |
| 2,889,698 | 6/1959 | Stevens | 52/410 |
| 2,928,565 | 3/1960 | Glasoe | 220/15 |
| 3,331,525 | 7/1967 | Coehn | 220/15 |
| 3,486,286 | 12/1969 | Samaga | 52/410 |
| 3,742,670 | 7/1973 | Byrd | 110/1 A |
| 3,771,467 | 11/1973 | Sweet | 110/1 A |

FOREIGN PATENTS OR APPLICATIONS

| | | | |
|---|---|---|---|
| 1,555,558 | 12/1968 | France | 220/15 |
| 1,158,026 | 7/1969 | United Kingdom | 176/87 |

*Primary Examiner*—Ernest R. Purser
*Assistant Examiner*—James L. Ridgill, Jr.
*Attorney, Agent, or Firm*—Kirschstein, Kirschstein, Ottinger & Frank

[57] ABSTRACT

A nuclear reactor containment vessel faced internally with a metal liner is provided with thermal insulation for the liner, comprising one or more layers of compressible material such as ceramic fiber, such as would be conventional in an advanced gas-cooled reactor and also a superposed layer of ceramic bricks or tiles in combination with retention means therefor, the retention means (comprising studs projecting from the liner, and bolts or nuts in threaded engagement with the studs) being themselves insulated from the vessel interior so that the coolant temperatures achieved in a High-Temperature Reactor or a Fast Reactor can be tolerated with the vessel.

The layer(s) of compressible material is held under a degree of compression either by the ceramic bricks or tiles themselves or by cover plates held on the studs (in which case the bricks or tiles are preferably bedded on a yielding layer (for example of carbon fibers) rather than directly on the cover plates.

Mutually adjacent bricks or tiles are jointed to one another by tongue-and-groove joints and/or lap joints. The bricks or tiles may be rectangular and of two kinds, with each of one kind disposed chessboard fashion between four of the other kind and a peripheral flange in one half of the thickness of each brick or tile of one kind forming lap joints with peripheral flanges in the other half of the thickness of the adjacent four bricks or tiles of the other kind.

14 Claims, 14 Drawing Figures

NUCLEAR REACTORS

This invention relates to nuclear reactors, and in particular to the provision of thermal insulation on such inner surfaces, of a containment vessel in which is housed a fluid-cooled nuclear reactor core, as are exposed to the core coolant fluid while it is at high temperature. The invention is of particular application in relation to the internal thermal insulation of a concrete pressure vessel of a gas-cooled High Temperature Reactor or Fast Reactor, though it may also be of comparable value in relation to a liquid-cooled (e.g. sodium-cooled) Fast Reactor.

In currently-known designs of Advanced Gas-cooled Reactor having the reactor core housed in a concrete pressure vessel whose inner surfaces are covered by a metal liner, the thermal insulation provided on those parts of the liner which would otherwise be exposed to the coolant gas at high temperature is in the form of a layer or layers of either ceramic fibres or metal foil packs, and in either case this insulation has to be retained in place by retention means which is commonly a system of steel cover plates held in place on studs which project from the liner through the insulating layer or layers. In order to restrict the percolation of coolant gas into the thermal insulation through expansion gaps left between the cover plates (and also to protect the insulation from coolant circuit noise) there is provided a membrane either in the form of a series of metal plates which are made to overlap (with a capacity to slide over one another to accommodate thermal expansion) or constituted by a continuous metal skin which is flexible for the same purpose; and the cover plates, as also the skin or the overlapping plates with their sliding joints, is or are necessarily exposed to some extent to the high-temperature coolant gas.

Such an arrangement would be undesirable in a High Temperature Reactor or a Fast Reactor, especially in a case where helium is employed as the reactor coolant, since, at the higher temperatures achieved by the coolant, corrosion of the metal exposed to the high-temperature coolant would become a problem and, particularly in a helium atmosphere at high temperature and very dry, a problem would also arise if there were provided membrane plates which were required to slide over one another.

It has also been proposed to provide, for a horizontal inner surface (constituting a floor) of such a containment vessel, thermal insulation in the form of layers of ceramic bricks or tiles. According to that proposal, the bricks or tiles are retained in position merely by their own weight, and no retention means is provided or required to be thermally insulated from the interior of the vessel.

It is an object of the present invention to provide inner surfaces of a containment vessel of a fluid-cooled reactor with positively retained thermal insulation which presents to high-temperature coolant fluid within the vessel a surface which is free of metal and in which any metal content of the insulation and of the retention means therefor which is provided is itself substantially thermally insulated from such coolant fluid.

According to the invention in its broadest aspect, there is provided a nuclear reactor containment vessel having an internal surface faced with a metal liner and having, disposed over the metal liner, thermal insulation which comprises a layer of ceramic bricks or tiles, wherein the thermal insulation also comprises at least one interposed layer of compressible porous thermally insulating material disposed between the bricks or tiles and the metal liner and wherein there are provided retention means constituted by studs, which are secured on the metal liner and project through the interposed layer, and by securing means by which the bricks or tiles are individually secured to the studs, the studs and securing means being themselves insulated from the vessel interior by the said thermal insulation.

The invention will be more fully understood from the following description of various preferred embodiments of it, as applied to the gas-cooled High Temperature Reactor, with reference to the accompanying drawings, in which.

Figure 2:
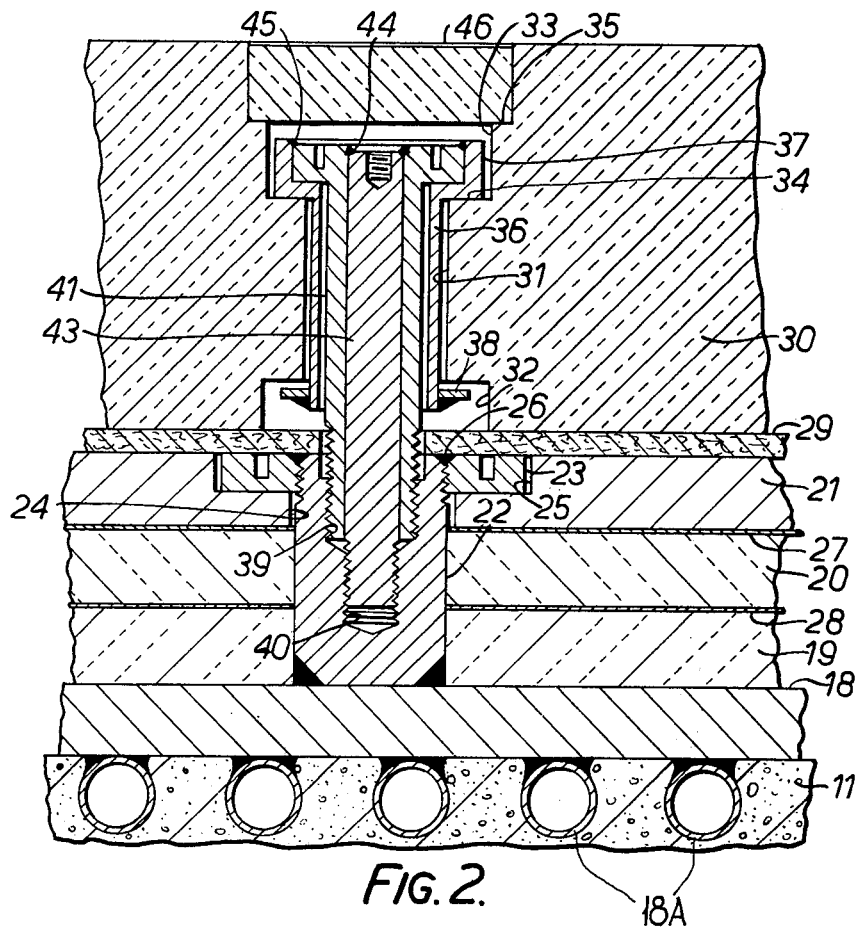
FIG. 2 is a typical sectional view, on a larger scale, through insulation provided according to the invention in the regions indicated in FIG. 1.
Figure 3:
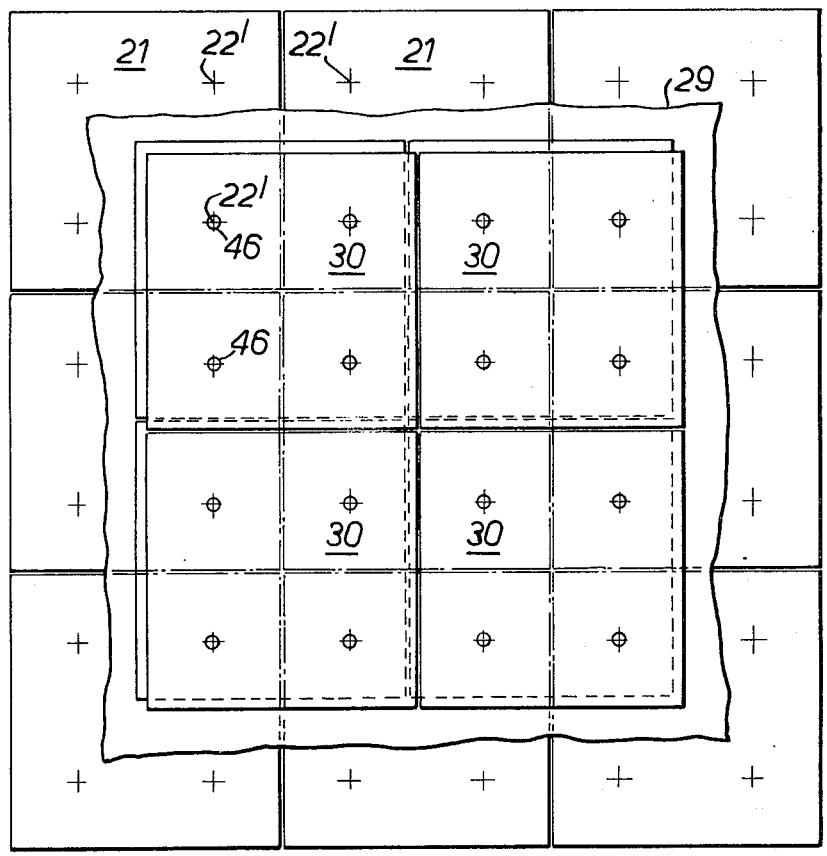
FIG. 3 is a diagrammatic elevation, on an intermediate scale, of insulation shown in FIGS. 1 and 2.
Figure 6:
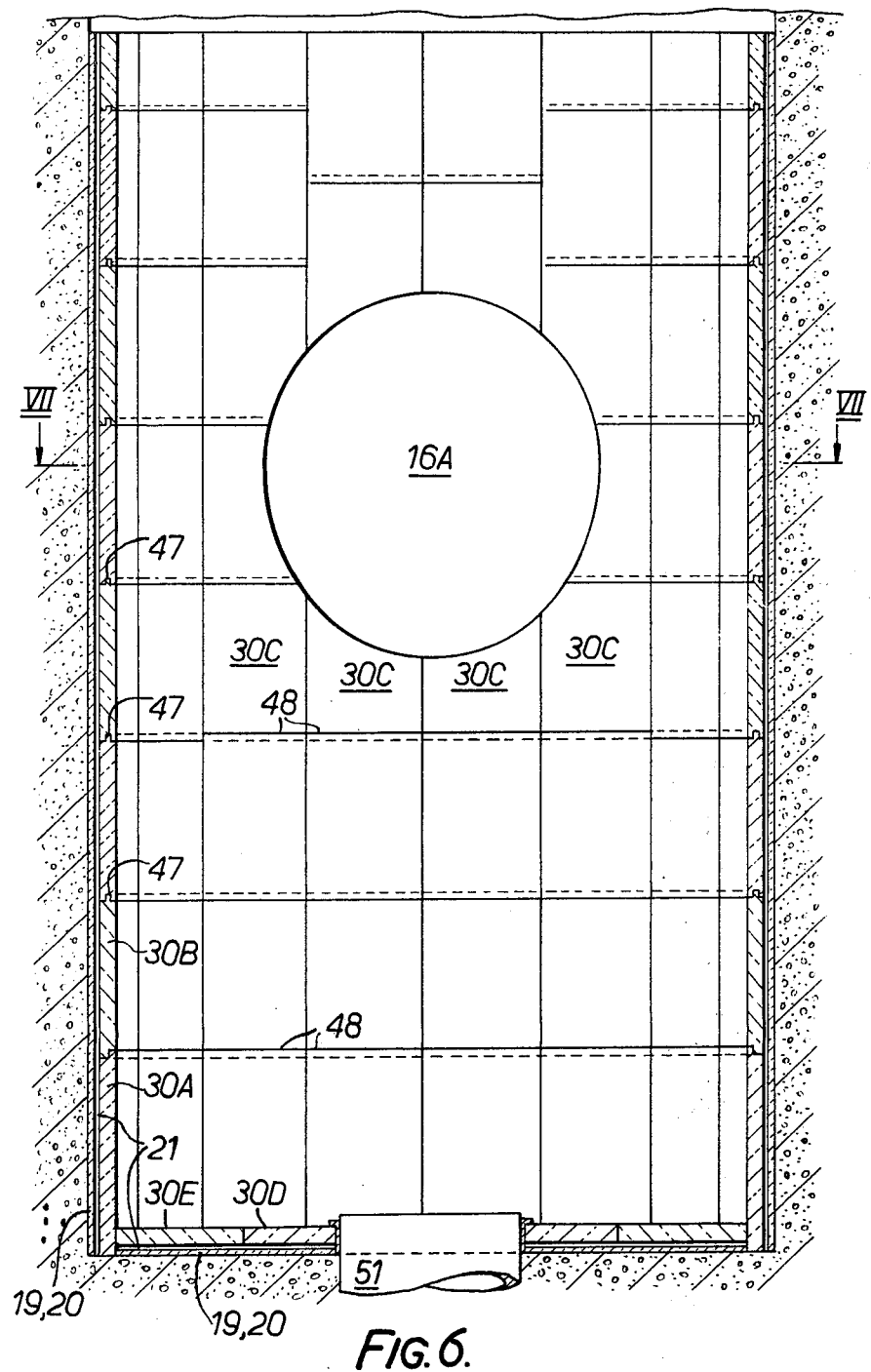
FIG. 6 is a sectional view taken on the line VI—VI of FIG. 1, on a larger scale.
Figure 7:
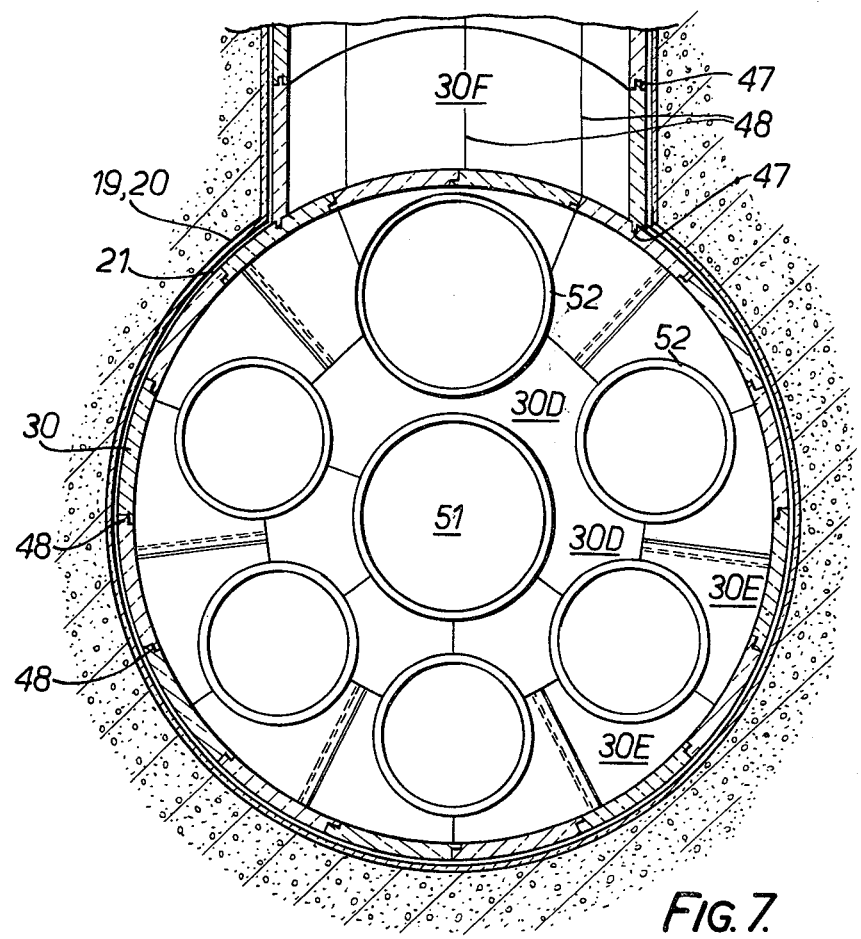
Figure 8:
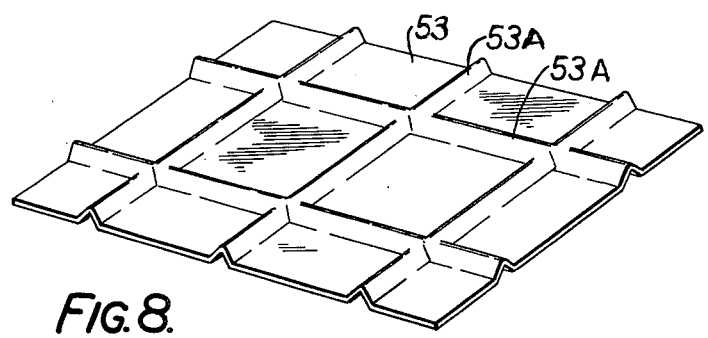
Figure 9:
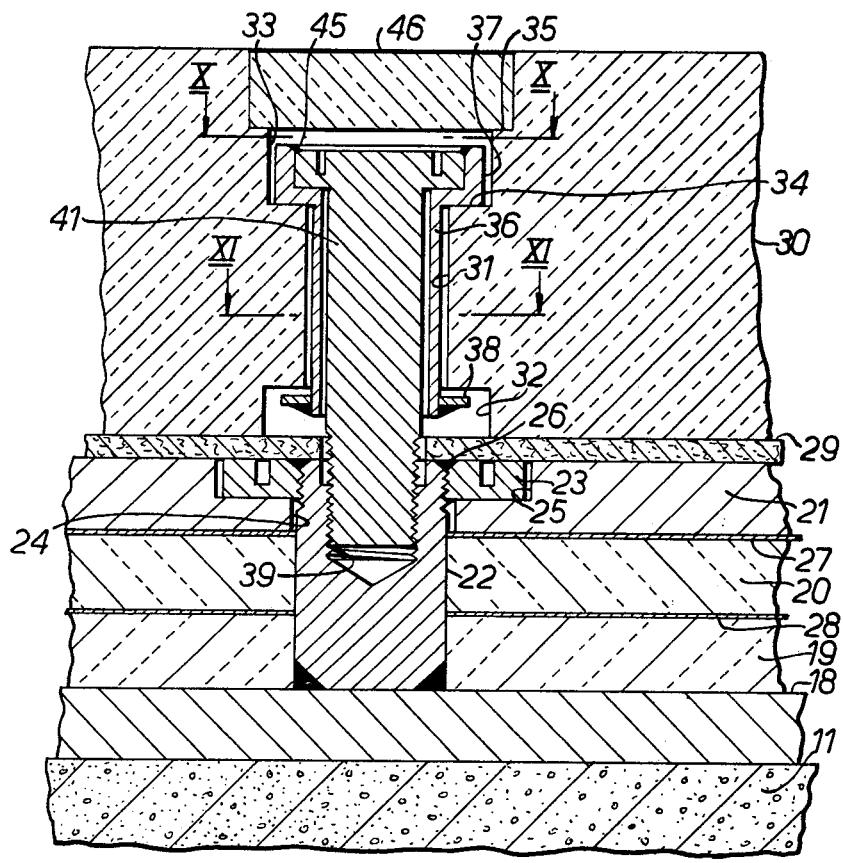
Figure 10:
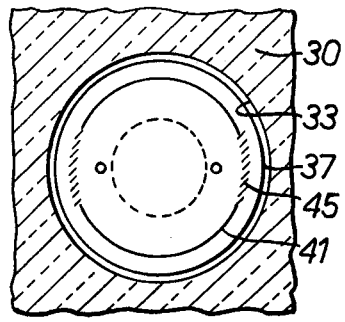
Figure 11:
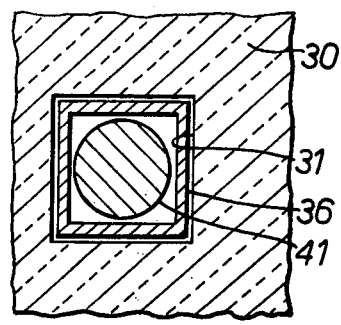
Figure 12:
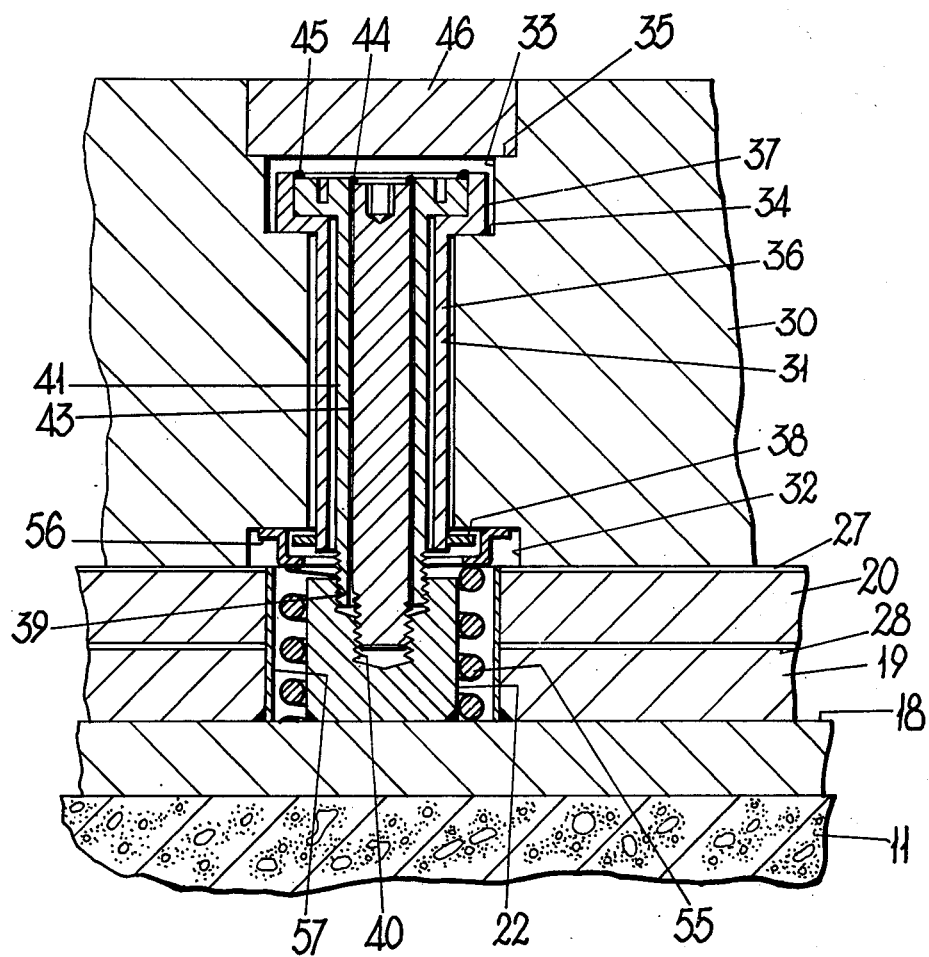
Figure 13:
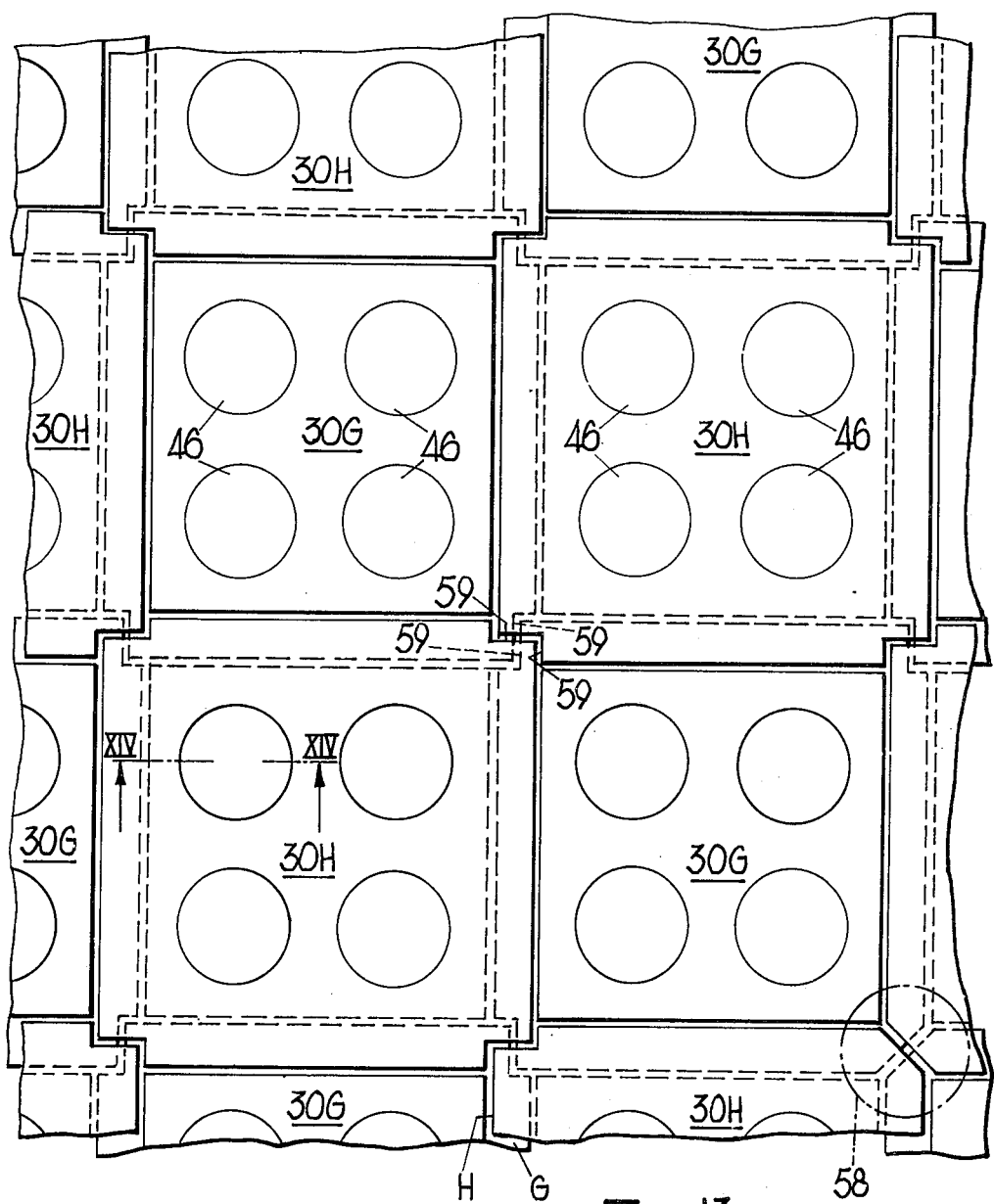
Figure 14:
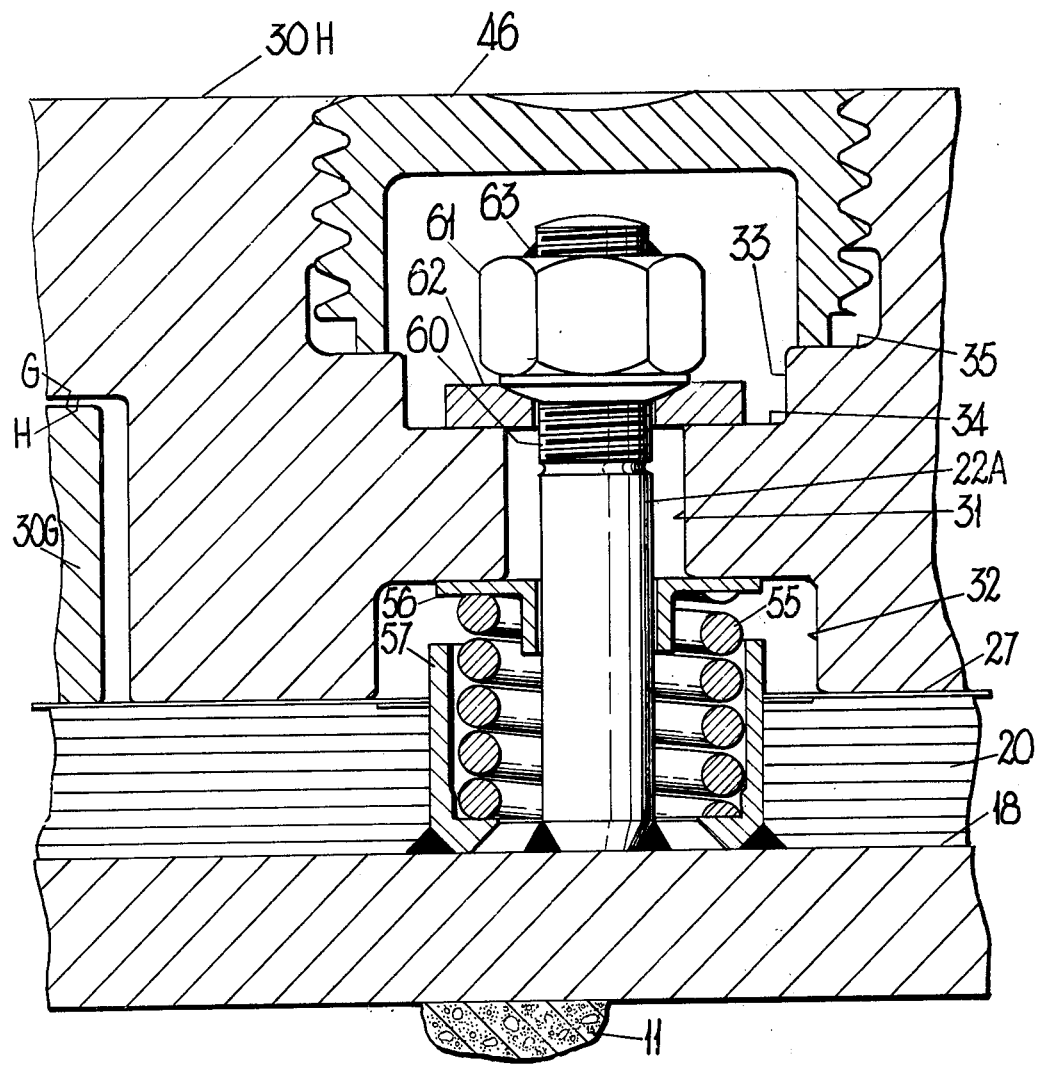

FIG. 7, on the same scale as FIG. 6, is a section taken on the line VII—VII thereof;

FIG. 8 is a perspective view of metal foil which may be employed in conjunction with the insulation;

FIG. 9 is a sectional view, corresponding to FIG. 2, of insulation secured by modified retention means;

FIGS. 10 and 11 are scrap sectional views taken on the lines X—X and XI—XI, respectively, of FIG. 9, FIG. 12 is a sectional view, corresponding to FIG. 2 or FIG. 9, of a modified form of insulation and of further modified retention means for securing it, FIG. 13 is a diagrammatic elevation, corresponding to FIG. 3, of a further modified form of thermal insulation, and FIG. 14 is a sectional view, corresponding to FIG. 2, 9 or 12, taken at a larger scale on the line XIV—XIV in FIG. 13.

Figure 1:
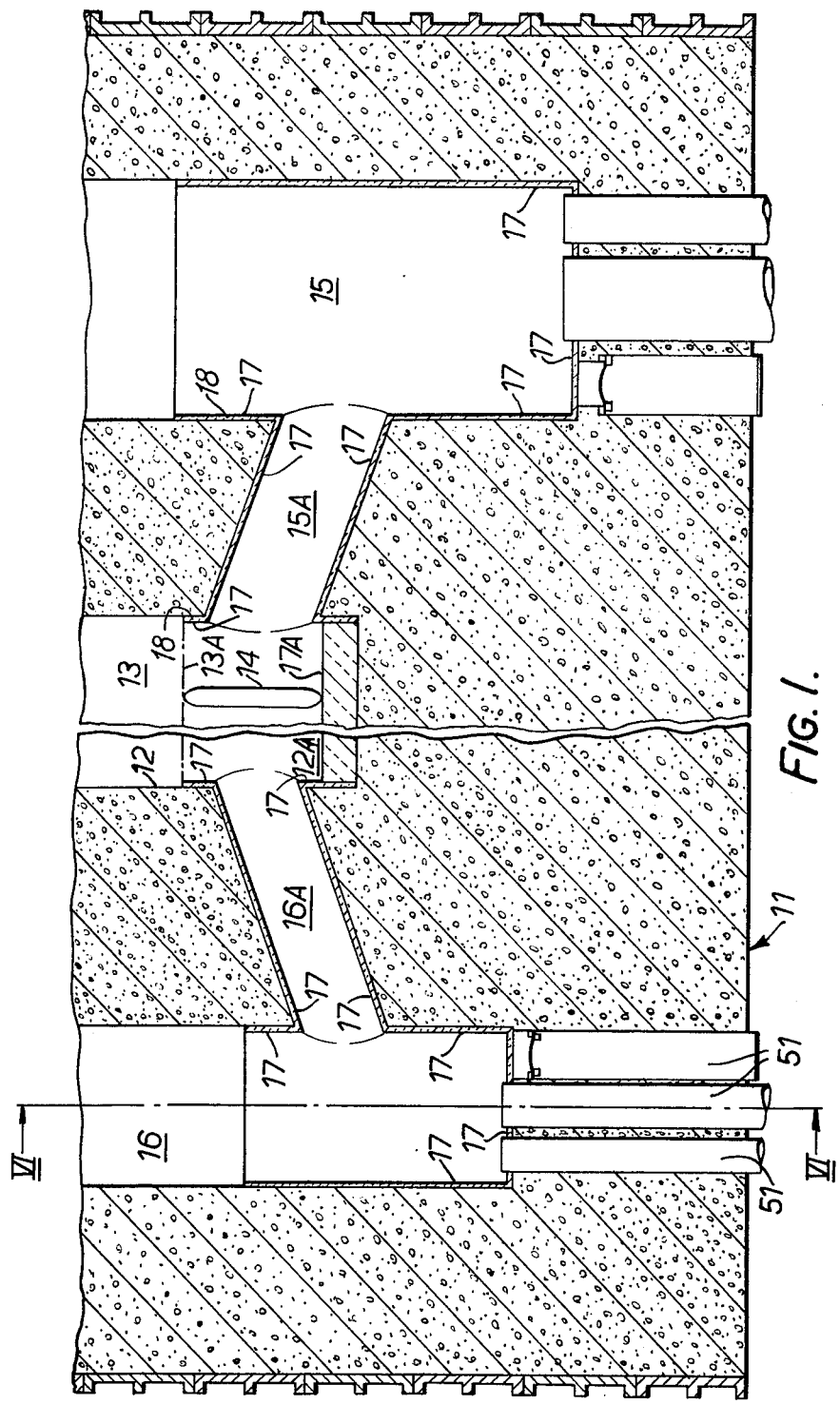
FIG. 1 is a vertical section through the lower end of a concrete pressure vessel of a High Temperature Reactor, showing regions of its inner surfaces which are provided with thermal insulation in accordance with the invention.

Referring now to FIG. 1, there is shown the lower part of a concrete pressure vessel 11 of a High Temperature Reactor of known general configuration. The vessel 11 defines a central cavity 12 in which is housed a core 13 of the reactor, the core having a bottom surface 13A and being supported (for example, by pillars 14 of which one is shown) so that below the bottom 13A of the core there is defined at the lower end of the cavity 12 a chamber 12A. Within the wall thickness of the vessel 11 there are formed cavities 15, 16 each accommodating respectively a main or an auxiliary boiler (not shown) and each in communication with the chamber 12A through a respective duct 15A or 16A. In similar manner (not shown), each cavity 15 or 16 also communicates, near its upper end, through a respective duct with an upper chamber defined within the cavity 12 above the core 13. Each of the cavities 15 and 16 also houses a respective coolant circulator (now shown) arranged to supply reactor coolant gas to the upper chamber, whence it flows downwardly through the core 13 (thus cooling the core and becoming heated to a high temperature) to emerge into the chamber 12A. From there, the hot coolant flows through the ducts 15A and 16A to the cavities 15 and 16, in which it passes through the main and auxiliary boilers in heat-exchanging relationship with water supplied thereto, before returning to the circulators for recirculation.

It will be appreciated that the coolant gas is at its hottest while in the chamber 12A, ducts 15A and 16A and the lower parts of the cavities 15 and 16 before it enters the boilers. The temperature of the coolant gas in these regions, in a High Temperature Reactor, may be well in excess of 700°C, and thus substantially higher than any coolant gas temperature encountered in, say, an Advanced Gas-cooled Reactor; and the corresponding inner surfaces of the vessel 11 must accordingly be provided with thermal insulation 17, the extent of which is shown in FIG. 1, which is suited to the demanding conditions.

FIG. 2 illustrates an embodiment of such suitable thermal insulation according to the invention, together with retention means by which the insulation is retained in position on the relevant parts of a steel liner 18 with which, it will be understood, the whole of the inner surfaces of the pressure vessel, defining the cavities 12, 15 and 16 and the ducts (including the ducts 15A and 16A) extending therebetween is provided in known manner.

As shown in FIG. 2 (in which the reference numeral 18 denotes the liner, mentioned above, which is provided on inner surfaces of the concrete of the vessel 11 and which is cooled by water flowing in cooling pipes 18A which are in good thermal contact with the liner 18 and which are recessed into the surface of the concrete) there are first placed against the liner 18 one or more layers of insulating material 19, 20 which may suitably be of ceramic fibre and/or meta foil and mesh, and which may be substantially as already known in connection with the Advanced Gas-cooled Reactor. These layers 19, 20 are held in place by retention means comprising steel cover plates 21 in combination with studs 22 and collars 23, the studs being welded to the liner 18 and projecting through the layers 19, 20 and through apertures 24 in the cover plates 21, and the collars 23 being threaded internally and screwed on to the free ends of the studs 22, which are correspondingly threaded externally, so as to retain the cover plates 21 in place and exert any desired compression on the insulating layers 19, 20. The cover plates 21 are formed with recesses 25, surrounding their apertures 24, to accommodate the collars 23, whose free faces thus lie flush with the free faces of the cover plates and with the free ends of the studs 22 to which, preferably, they are welded as at 26 so as to lock them in place after fitting. Preferably, sheets of steel 27 and 28 are arranged in membrane layers, with their edges slidably overlapping, between the cover plates 21 and the layer 20 and, respectively, between the layers 19, 20.

The insulation and the retention means therefor, so far as described in the preceding paragraph, are substantially as known in connection with the Advanced Gas-cooled Reactor, but are not suitable for exposure to the high coolant-fluid temperatures experienced in, say, a High Temperature Reactor, especially if the coolant fluid is helium which, at such high temperatures, would tend to corrode exposed parts of the retention means (cover plates 21, studs 22, collars 23) and of the steel sheets 27, which latter, also, would slide over one another with difficulty in a helium atmosphere.

In order to limit acceptably the temperatures to which the above described elements of the insulation are subjected, and to isolate them from contact with the reactor coolant fluid, the insulation shown in FIG. 2 further comprises a deformable layer 29, suitably of graphite felt, and a layer of ceramic bricks or tiles 30 superposed and bedded thereon. The bricks are formed with through holes or bores 31 for receiving securing bolts (described below), each bore 31 being surrounded at one end by a recess 32, in that face of the brick which lies against the layer 29, and at its other end by a stepped recess 33 having shoulder faces 34 and 35. Before the bricks 30 are fitted in place, each bore 31 is fitted with a sleeve 36 formed at one end with a flange 37 which seats on the shoulder face 34, the sleeve being then provided at its other end with a ring 38 which is firmly secured in place (by welding, in the illustrated embodiment) and which is accommodated in the recess 32 and prevents removal of the sleeve from the bore 31. The sleeves 36 are thus captive sleeves.

For securing the bricks 30 in place, each stud 22 is formed with a stepped bore having two threaded portions 39 and 40 of different diameter, the threaded portions being of mutually different thread pitch or of mutually opposite hand. The bricks 30 are placed in position with each bore 31 aligned with a respective stud 22, and are secured in place by inserting through each sleeve 36 a respective headed hollow bolt 41 having an externally threaded end, which mates with and is screwed into the larger-diameter threaded portion 39 of the respective stud 22, and a head which is thus brought into retaining engagement with the shoulder face 34 or, strictly, with the overlying flanged part 37 of the sleeve 36. After the bolt 41 has been tightened to the required degree an inner bolt 43 having an appropriately threaded end is inserted through the hollow headed bolt 41 and screwed into threaded engagement in the portion 40 of the stud 22.

Further relative rotation between each inner bolt 43 and the corresponding headed bolt 41 is then prevented by, suitably, lock-welding the two bolts together as at 44; and each bolt 41 is also welded, as at 45, to the flanged part 37 of the sleeve 36 through which it passes. Finally, the heads of each pair of bolts 41 and 43 are covered by cementing a ceramic plug 46 in place in the respective recess 33, this plug having one face seated on the shoulder face 35 of the recess and an opposite face flush with the adjacent face of the brick 30 in which the recess is formed.

As further described below, each brick 30 is preferably held in place by a plurality of pairs of bolts 41, 43, so that even if one pair should fail other pairs will continue to retain the brick. In the event of failure of a pair of bolts, the fact that they are secured together and to the surrounding flange 37 means that they, together with the surrounding captive sleeve 36, are held captive by the ring 38 on the sleeve, whereby the covering plug 46 is prevented from becoming displaced or damaged. Furthermore, as is also described below, each brick 30 is preferably so formed that it interlocks with its neighbours in such a way that, even in the event of failure of all the bolts 41, 43 which secure it in position, it would be retained in position by those neighbouring bricks.

Figures 4, 5:
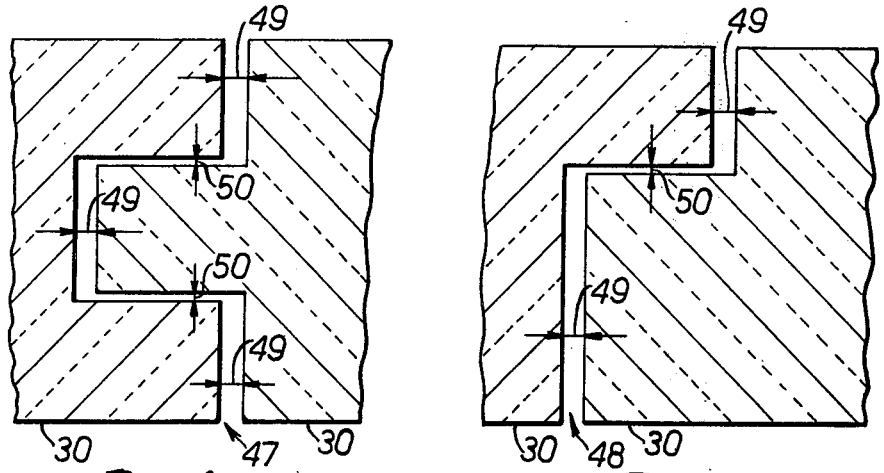
FIGS. 4 and 5 are scrap sectional views, on the same scale as FIG. 2, showing interengagement of the edges of ceramic bricks comprised by the insulation shown in FIGS. 1 to 3.

FIG. 3 shows a typical arrangement of a layer of the bricks 30 superposed on a layer of the cover plates 21. As shown, each cover plate 21, overlying the insulating layers 19, 20 (not shown in FIG. 3) which it holds in place, is held in position by four of the studs 22, which are arranged in a square pattern and whose positions are indicated by crosses 22' in FIG. 3; and each of the ceramic bricks 30 is disposed over mutually-adjacent corners of four of the cover plates 21, and secured in place by four bolt pairs 41, 43 each engaged in a stud 22 associated with a respective one of the four cover plates 21. The bricks 30, which are square, are formed with interengaging edges, suitably in the form of tongue-and-groove joints 47 as shown in FIG. 4 or lap joints 48 as shown in FIG. 5, with clearance gaps 49 and 50 which may be of width 4 mm. and 1 mm. respectively in bricks which are some 63 mm. thick and some 600 × 600 mm. square.

FIGS. 6 and 7 show how the bricks 30 may be arranged on the cylindrical wall of, say, each of the cavities 16. As shown in FIG. 7, the vertical edges of the bricks 30 form lap joints 48; and (FIG. 6) horizontal lap joints 48 are also formed between a lowermost course 30A of the bricks and the next course 30B, as well as between the lower edges of those bricks 30C, whose upper edges conform to the lower edge of the duct 16A, and the upper edges of the corresponding bricks in the course below. The remaining horizontal joints between courses are tongue-and-groove joints 47.

The floor of the cavity 16, between various access apertures 51 which are provided, is also covered with thermal insulation generally similar to that of the cylindrical wall part and as shown in FIG. 2, but without the securing studs 22 and bolt pairs 41, 43 there shown; and the bricks 30 in this case are preferably arranged, as shown in FIG. 7, in concentric rings of bricks 30D and 30E, held down partly by gravity and partly by securing rings 52 removably secured in position to the upper ends of liners of the access apertures. The bricks 30E abut the lower ends of the bricks 30A, but any one of these latter can be removed, after grinding off the locking welds 44 and 45 of the bolts 41, 43 which hold it and after removal of those bolts (not shown in FIGS. 6 and 7), if the adjacent brick or bricks 30E are first removed (which involves removing also one or more of the rings 52). Removal of one of the bricks 30A enables the brick 30B above it to be removed (after similar removal of the bolts 41, 43 securing the latter); and in similar manner any of the bricks of higher courses can also be removed, for example for replacement if it has become damaged. It will be appreciated, however, that so long as the bricks 30E on the cavity floor remain in place, each brick on the cylindrical wall would be held in place by its interengagement with adjacent bricks, even if all the bolt pairs 41, 43 which secure it were to fail for some reason.

The thermal insulation provided for the cavity 15 and the chamber 12A will not be described or illustrated in detail, since it is substantially the same as in the cavity 16, except that the insulation 17A on the floor of the chamber 12A, which has to transmit the weight of the core 13 transmitted through the pillars 14, is suitably composed in known manner simply of one or more layers of ceramic or graphite hearth bricks which are held in position by contact with one another and by gravity. Peripheral ones of these hearth bricks help to retain in position the lowermost course of bricks round the vertical wall of the chamber 12A, and must be removed (like the bricks 30E) to enable bricks to be removed from the vertical wall.

The insulation on the walls of the ducts 15A and 16A is also similar to that in the cavity 16 and, as seen in FIG. 7, the bricks 30F of this insulation, in circular courses round the duct, preferably have tongue-and-groove joints 47 between one course and the next (and between those bricks in the ends of the duct and the adjacent bricks on the wall of the cavity 13, 15 or 16) and lap joints 48 between those edges of the bricks 30F which extend in the longitudinal direction of the duct. Removal of bricks 30F in the ducts requires (in addition to removal of the bolt pairs 41, 43 which secure them) removal, first, of bricks from the wall of the cavities 13, 15 or 16 between which the duct extends.

It will be seen from the foregoing description that the insulation 17 comprises what may be regarded as a conventional part, constituted by the layers 19 and 20, the cover plates 21 and the interposed membrane layers 27 and 28, overlaid by the ceramic bricks 30 and the deformable layer 29 on which these are bedded. The layer 29 serves principally to accommodate differential thermal expansion between the bricks 30 and the bolt pairs 41, 43 by which these are retained, and to allow bowing of the bricks 30 due, for example, to temperature gradient effects; but it is also effective to limit penetration to the cover plates 21 of reactor coolant fluid which may seep through the joints between adjacent bricks 30.

The bricks 30 are, desirably, of a material which exhibits low thermal conductivity, low gas permeability, a low thermal coefficient of expansion, accuracy of forming either by moulding or by machining, relatively high strength, and stability in the intended environment. One suitable material is silicon nitride in an expanded form (for example, foamed or sintered), particularly if the exposed surfaces of the bricks are finished with a flame-sprayed layer of silicon nitride to increase their impermeability. Another suitable material is that known as "cast, fused silica" which is made by moulding, and then drying and heating, a slurry of silica and/or powder; and bricks of this latter material are available in this country (from a French source) under the name MASROCK, or under the name NORSIL from Gimson Ltd., or from Pickford Holland Ltd.

The ceramic fibre material which the layers 19 and 20 may comprise may suitably be aluminum silicate fibre such as that available in this country from Morgans under the name TRITON KAOWOOL or from I.C.I. under the name SAFIL. An alternative material available from I.C.I., also under the name SAFIL, is a zirconium oxide fibre material; and another suitable material is that known as "Quartz et Silice" and available from the French company of that name.

The interengagement of the bricks at their edges provides them (as noted above) with a secondary retention system by which a brick remains held in place even in the event of failure of all the bolt pairs 41, 43 by which it is primarily held. The inter-brick interengagement also serves to minimise the passage of reactor coolant fluid between adjacent bricks; and as noted above such fluid passage is further limited by the layer 29 on which the bricks 30 are bedded.

The "conventional" part of the insulation 17 is incorporated because it is possible by this means to achieve a better thermal insulation than could be achieved with an equal thickness of ceramic brick material, and thus to achieve a reduction in the overall required thickness of the insulation 17; and also because coolant fluid leakage between the bricks 30 (which can be restricted as above described but not completely avoided) leads to "hot streaks" which are tolerable on the cover plates 21 but would not be acceptable directly on the metal liner 18 of the pressure vessel.

The insulation 17 as above described can be used in connection with coolant fluid at substantially higher temperatures than would be permissible with its conventional part alone. Thus the exposed faces of the bricks 30 may be in contact with the coolant fluid at a temperature of 720°C without the layers 19 and 20 being subjected to temperatures above about 400°C and without any of the metal parts (including bolts 41, 43) being subjected to temperatures above 600°C (which is less than the temperatures to which comparable insulation is subjected in current gas-cooled reactors).

In a case where the reactor coolant is liquid sodium rather than a gas such as carbon dioxide or helium, it is permissible to prevent completely any penetration of the coolant into the insulation by facing the insulation (i.e. the exposed surface presented by the ceramic bricks 30) with a continuous foil of metal which can withstand the temperatures obtaining and will not be corroded by the sodium. Suitable foil is known, under the name "Technigaz," and may be a foil 53 of some 1 mm. thickness and formed with a pattern of ridges or folds 53A in two mutually intersecting parallel sets, as shown in FIG. 8, to accommodate a thermal differential between the foil and the bricks 30 on which it is superposed.

It will be understood that the use of the removable bolts 41 for securing the bricks 30 in position, rather than merely increasing the lengths of the studs 22 and providing them with additional nuts for engagement with the bricks 30, has been selected for use in the above-described embodiment of the invention because it permits the sliding movement which is required when removing or replacing individual bricks which engage at their edges with adjacent bricks in a manner which prevents them from being removed merely by movement in the axial direction of the studs; and the provision of a bolt 43 in association with each bolt 41 enables the latter to be locked against rotation relative to the respective stud 22. However, alternative means of achieving this locking effect are possible; and one such alternative is illustrated in FIGS. 9 to 11.

FIG. 9 corresponds to FIG. 2, and the same reference numerals indicate corresponding parts in the two Figures, these parts being the same in the two Figures except for such differences as are now described. In FIG. 9, the bolt 41 is not hollow, and no inner bolt is provided corresponding to the bolt 43 in FIG. 2; and correspondingly, the stud 22 in FIG. 9 has only a single internally threaded portion 39. In the absence of an inner bolt to lock the bolt 41 againt unwanted rotation, this locking effect is provided by making the sleeve 36 (to whose flanged part 37 the bolt 41 is welded) non-rotatable in the bore 31 of the brick 30. To that end, the bores 31 in the bricks 30 are, in the construction shown in FIG. 9, of non-circular section, for example of square section as shown in FIG. 11, and the part of the sleeve 36 which extends through such a bore is shaped correspondingly and thus of hollow square cross-section so as to prevent any substantial rotation of the sleeve in the bore. The ring 38 is also, of course, of correspondingly modified shape. The flange 37 of the sleeve 36 is unchanged in shape; and FIG. 10, which is a sectional view on the line X—X in FIG. 9, is equally a corresponding sectional view taken on a corresponding line in FIG. 2.

In the above-described embodiments of the invention, the cover plates 21 are provided to retain the underlying layers 19 and 20 in place. In the modification illustrated in FIG. 12, the cover plates 21 and collars 23, and also the superposed layer 29 of graphite felt or the like are omitted; and it is the bricks 30 themselves, bearing directly on the membrane layer 27 and secured in place by the bolts 41 and 43, which hold the layers 19, 20 and their covering membrane layers 27 and 28 in position and under the desired compression.

In order that the stresses to which the bricks 30 are subject may remain within the acceptable limits, the bricks are preferably of smaller size (in terms of wall area covered) than in the arrangement described with reference to FIGS. 3, 4 and 5. Thus the size of the bricks may be 400 × 400 mm, or 300 × 300 mm, instead of the 600 × 600 mm size which is referred to with reference to FIG. 3. The reduction in area covered means that the brick thickness may be correspondingly increased without increasing its weight (if the same material is used); and the increase in thickness assists in enabling the brick to safely apply the desired forces to the layers 19, 20.

In the arrangements shown in FIGS. 2 and 9, it is the layer 29 which, because the cover plates 21 are substantially fixed in position, is required to deform in order to accommodate differential thermal expansions as between the bolts 41, 43 and the brick 30; and the layer 29 is preferably made as thin as possible consistent with this duty. With the cover plates 21 and the layer 29 both omitted, however, as in FIG. 12, this accommodation of differential thermal expansions is performed by the much thicker layers 19 and 20, and because of their much greater thickness the deformation to which they are subjected in consequence is proportionally much less.

In both arrangements (that is, as shown in FIG. 12 and equally as shown in FIGS. 2 and 9) it is important that bricks 30 should be held tight against the heads of the retaining bolts 41. In the arrangement shown FIGS. 2 and 9 this depends on the layer 29, and (to a lesser extent) the layers 27 and 28, maintaining an adequate resistance to compression; and difficulties could arise if, over a long period of time, these layers were to sag, or lose their resilience or even, partially, to crumble and disintegrate.

In the modification shown in FIG. 12, however, each stud 22 is surrounded by a coil spring 55 which is under compression between the liner 18 and an annular seating ring 56 provided in the recess 32 of the respective brick 30. The four springs 55 which are provided for each brick 30 (since each is bolted to four studs 22) are adequate to hold the brick against the heads of its retaining bolts even if the parts of the layers 19 and 20 which are covered by the brick should fail completely and cease to apply any force to the brick. A sleeve 57, welded to the liner 18, surrounds the spring 55 and keeps it free from interference by the layers 19 and 20.

It will be understood that although the bolt 41 in FIG. 12 is held against rotation by welding it to an inner bolt 43 (as in FIG. 2), the equivalent effect may equally be achieved by making the sleeve 36 non-rotatable in the brick 30 (as in FIG. 9).

The insulation and retention means therefor shown in FIGS. 13 and 14 provide an embodiment of the invention which is in some respects simpler than those already described. As shown in FIG. 14, the liner 18 of the concrete pressure vessel 11 (of which only a fragment is shown) is provided with a single layer 20 of ceramic fibre insulation material covered by a single membrane 27 which in turn is covered by a layer of ceramic bricks or tiles 30. The bricks or tiles 30 in this case are square, with peripheral flanges, and are of two kinds, namely bricks or tiles 30G in which the peripheral flange G constitutes a lateral extension of the brick or tile in that half of its thickness which is nearest to the liner 18 and bricks or tiles 30H in which the peripheral flange H constitutes a lateral extension of the brick or tile in that half of its thickness which is furthest from the liner 18. Each brick 30G has four of the bricks 30H disposed adjacent to its four sides, with its flange G overlapped by parts of the flanges H of the four bricks 30H; and similarly the flange H of each brick 30H is overlapped by parts of the flanges G of four adjacent bricks 30G. All the corners of the flanges G and H may be chamfered obliquely as shown within a chain-line circle 58 at the lower right-hand corner of FIG. 13; but preferably the required shaping of these corners, to enable bricks of the same kind to be positioned correctly relative to one another, is effected (as illustrated at all the other corner positions shown in FIG. 13) by providing each corner of each flange G or H with a step-shaped rebate 59. Particularly as the bricks (although) repesented in FIGS. 13 and 14 as flat) will usually have a curvature to correspond to a curvature of the liner 18, it is easier to manufacture and assemble the bricks if they have this preferred form of step-shaped rebate 59.

In assembling a layer of the bricks 30G and 30H, it is possible to assemble first all the bricks 30G in position (like, say, the black squares of a chess-board) and then to mount all the bricks 30H in the remaining spaces (like the white squares of the chess-board). This has the advantage that, if a brick 30H needs to be replaced, it can be removed without first removing any other brick and that, if a brick 30G needs to be replaced, it can be removed after first removing only the four adjacent bricks 30H. A brick 30G would still be retained in place by the adjacent bricks 30H, even if all its own retention means (as described below) were to fail. The same is not true of the bricks 30H, but it has been established satisfactorily that the chance of failure of all the retention means of a brick is so small that it can be neglected.

As will be seen from FIG. 13, each of the bricks 30G and 30H is fitted with four plugs 46 in a square array, as in the embodiment shown in FIG. 3, and (as shown in FIG. 14) each plug 46 covers a respective stud 22A coaxial therewith and welded to the liner 18. As may also be seen from FIG. 13, the distance between adjacent plugs 46 of a given brick is less than the distance between any one of these plugs and the nearest plug of an adjacent brick, so in this case the studs 22A are not disposed in a strictly regular square array on the liner 18. However, they may still be described as being arranged on the liner in a square pattern. Since, in this embodiment, the bricks 30G and 30H are fitted or removed by moving them in the direction normal to the liner 18 (with no lateral movement being required) it is permissible for the studs 22A to extend into the thickness of the bricks. As shown in FIG. 14, the studs 22A extend through the bores 31 of the bricks and are formed with external threads 60 to receive nuts 61 which bear on washers 62 in turn bear on the shoulders 34 formed round the bores 31 at the bottom of the larger-diameter recesses 33. The nuts 61 and washers 62 engage each other by part-spherical surfaces which provide accommodation for any small misalignment of the bricks relative to the studs. After tightening of the nuts 61 to provide any desired degree of compression of the ceramic fibre layer 20, the nuts are welded to the studs as at 63.

As in the arrangement shown in FIG. 12, each stud 22A is surrounded by a coil spring 55 held in compression between the liner 18 and a seating ring 56 provided in the corresponding recess 32 of the brick, and a sleeve 57, welded to the liner 18, surrounds the spring (and in this case also provides a seating for it) and keeps it free from interference by the layers 20 and 27. In this embodiment, there is no means (other than the plugs 46) for retaining a failed stud captive to its brick, but the security of the plugs 46 in their bricks is increased by forming them with external threads 64 and the bricks with corresponding threads, so that the plugs are screwed into position. The screw joint between each plug and its brick may be a loose fit, and may be packed with cement as the plug is screwed in, so as to give a very secure joint once the cement has set.

I claim:

1. A nuclear reactor containment vessel having an internal surface faced with a metal liner and having, disposed over the metal liner, thermal insulation which comprises a layer of ceramic bricks or tiles and at least one interposed layer of compressible porous thermally insulating material disposed between the bricks or tiles and the metal liner, there being also provided retention means constituted by studs, which are secured on the metal liner and project through the interposed layer, and by securing means by which the bricks or tiles are individually secured to the studs, and the studs and securing means being themselves insulated from the vessel interior by the said thermal insulation, wherein there are provided between the metal liner and the layer of bricks or tiles, in addition to the said interposed layer, resilient devices held in compression between the metal liner and the bricks or tiles and urging the bricks or tiles away from the metal liner.

2. A containment vessel as claimed in claim 1, wherein the securing means exert on the bricks or tiles forces which hold both the said resilient devices and the said interposed layer under compression between the bricks or tiles and the metal liner.

3. A containment vessel as claimed in claim 1, wherein the resilient devices are helical springs each disposed coaxially about a respective one of the studs.

4. A containment vessel as claimed in claim 1, wherein mutually-adjacent ones of the bricks or tiles engage one another edgewise by a tongue-and-groove joint.

5. A containment vessel as claimed in claim 1, wherein mutually-adjacent ones of the bricks or tiles engage one another edgewise by a lap joint.

6. A containment vessel as claimed in claim 5, wherein the bricks or tiles are rectangular and are of two kinds, namely a first kind and a second kind, disposed in chessboard fashion, the bricks or tiles of the first and second kinds each having a peripheral flange which constitutes a lateral extension of the brick or tile in that half of its thickness which is respectively nearest to and furthest from the metal liner whereby the flange of each brick or tile of the first kind is overlapped by parts of the flanges of four adjacent bricks or tiles of the second kind.

7. A containment vessel as claimed in claim 1, wherein each brick or tile is formed with at least one through hole having parts of smaller and larger cross-sections respectively nearer and more remote from the metal liner, the brick or tile having a plug of ceramic material which closes the part of larger cross-section and having between the said parts a shoulder on which one of the said securing means bears.

8. A containment vessel as claimed in claim 7, wherein the studs are threaded externally and the securing means comprise nuts threaded on to the studs.

9. A containment vessel as claimed in claim 7, wherein the plugs of ceramic material are threadedly engaged in the bricks or tiles.

10. A containment vessel as claimed in claim 7, wherein the said studs are provided on the metal liner in a square pattern and each is in register with a respective one of the said through holes of the bricks or tiles and is engaged by one of the said securing means.

11. A containment vessel as claimed in claim 7, wherein the studs are bored and internally threaded and the securing means are headed bolts threadedly engaging the studs and having heads which engage the said shoulders of the bricks or tiles.

12. A containment vessel as claimed in claim 11 wherein each stud has a stepped bore with two threaded portions of respectively greater and lesser diameter and of mutually opposite hand or mutually different pitch, the said headed bolts threadedly engage the threaded portions of greater diameter and are themselves axially bored, and there are provided inner bolts each extending through a respective one of the headed bolts and threadedly engaging the lesser-diameter threaded portion of the respective stud, the heads of the headed bolts being welded to the inner bolts.

13. A containment vessel as claimed in claim 11, wherein each said through hole is fitted with a captive sleeve and the heads of the bolts are welded to the captive sleeves.

14. A containment vessel as claimed in claim 13, wherein the through holes are of non-circular cross-section and the captive sleeves are non-rotatable therein.

* * * * *